No. 889,434. PATENTED JUNE 2, 1908.
J. BUSTANOBY.
CORN HOLDER.
APPLICATION FILED NOV. 15, 1907.
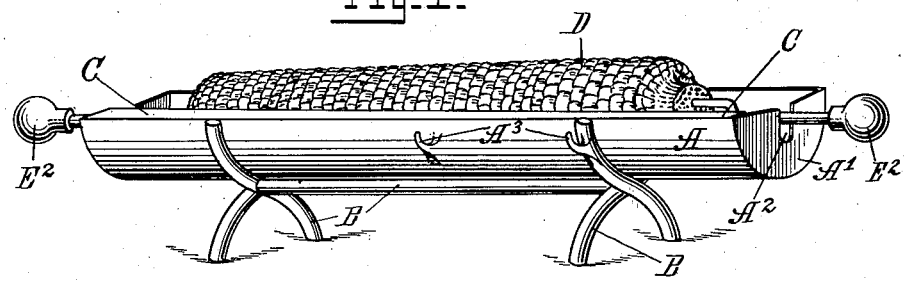
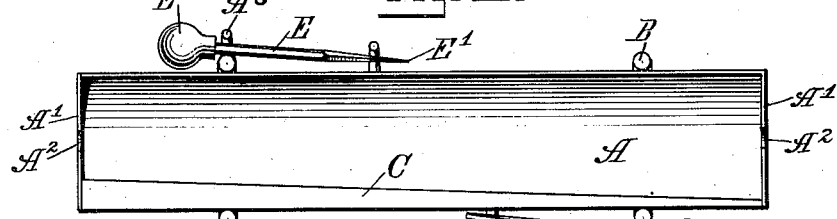
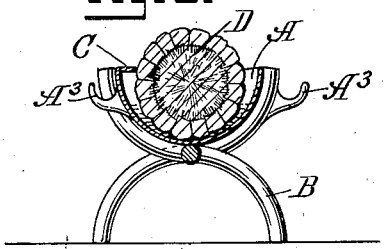
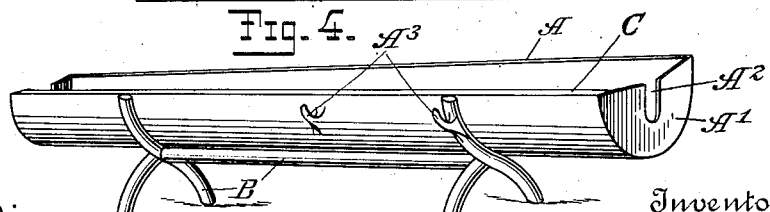
Witnesses:
G. V. Rasmussen
John Lotka
Inventor
JACQUES BUSTANOBY
By his Attorneys
Briesen & Knauth

UNITED STATES PATENT OFFICE.

JACQUES BUSTANOBY, OF NEW YORK, N. Y.

CORN-HOLDER.

No. 889,434.      Specification of Letters Patent.      Patented June 2, 1908.

Application filed November 15, 1907. Serial No. 402,248.

*To all whom it may concern:*

Be it known that I, JACQUES BUSTANOBY, a citizen of the French Republic, resident of the borough of Manhattan, city, county, and State of New York, have invented certain new and useful Improvements in Corn-Holders, of which the following is a specification.

My invention relates to devices for holding an ear of corn in such a manner as to enable it to be buttered evenly without soiling the user's hands and to be held conveniently at all times.

Other advantages of my invention will appear from the description following hereinafter.

Reference is to be had to the accompanying drawings in which—

Figure 1 is a perspective view of one form of my invention; Fig. 2 is a plan view thereof; Fig. 3 is a cross section and Fig. 4 is a perspective view of another form.

The improved article comprises a trough A set on legs B which may be separate therefrom (and similar in shape to knife-rests) or attached thereto. The trough is of sufficient length to receive the largest ear of corn, and has its end walls A' provided with vertical slots $A^2$ open at their upper ends. The cylindrical body portion of the trough, which rests on the crossed legs B, is preferably provided along one of its edges with an inwardly projecting scraper C, which thus overhangs the interior of the trough.

The ear of corn D is secured on handles E each of which has one or more prongs E' adapted to be driven lengthwise into the ends of the ear. These handles extend through the slots $A^2$ when the ear of corn rests in the trough. The ear may be supported in the trough either by resting on the bottom thereof, or the handles E may rest on the bottom of the slots $A^2$, holding the corn above the bottom of trough. The walls of the slot form guides for the handles, permitting them to be readily rotated in the trough with the corn, by means of the knobs $E^2$, and also to be inclined more or less, according to the shape of the ear. Furthermore, the slots being open at their upper ends, it is easy to place the corn in the trough, and to remove it therefrom, without disconnecting it from the handles. The trough may be inclined or slightly conical instead of horizontal and cylindrical, see Fig. 4.

The trough when in use contains either butter or some other substance, to be applied to the corn. By rotating the corn, the lower portion of which dips into such butter, and by inclining the corn toward one end or the other as required, the entire surface of the corn is buttered evenly. To prevent dripping I prefer to provide a longitudinal scraper such as C fastened at one or both of the edges of the trough's body portion, and this scraper projects over the interior of the trough so that any matter dripping from the corn as it is rubbed or rotated against the scraper, will fall back into the trough. It will thus be seen that the improved corn holder is very convenient and cleanly in use, and enables the corn to be buttered evenly from end to end and over its entire surface. There is no loss of butter as the drippings are collected in the trough and can be used for buttering another ear of corn. The shape of the article is such that it readily lends itself to ornamentation.

In order that the handles E may be preserved in a convenient position when not connected with an ear of corn, I arrange supports or brackets $A^3$ on the outside of the trough A, preferably near the ends thereof and on opposite sides, so as to afford a suitable place to keep the handles out of the way, yet in readiness for use.

I claim:

1. A corn holder comprising a trough having end walls with slots open at their upper ends, crossed legs on which said trough is supported, a longitudinal scraper projecting inwardly at one of the edges of the trough body, handles adapted to extend through said slots and provided with knobs to hold them and with prongs to engage the corn, and supports for said handles, located exteriorly of the trough near its ends, on opposite sides of the trough.

2. A corn holder comprising a trough having end walls with slots open at their upper ends, a longitudinal scraper projecting inwardly at one of the edges of the trough body and handles adapted to extend through said slots and provided with prongs to engage the ends of the corn.

3. A corn holder comprising a trough having end walls with slots open at their upper ends, and handles adapted to extend through said slots and provided with prongs to engage the corn.

4. A corn holder comprising a trough having vertical guides at its ends, and handles movable up and down in engagement with said guides and provided with prongs to engage the corn.

5. A corn holder comprising a trough, handles for holding an ear of corn supported in said trough, and supports located on the outside of the trough, for holding said handles when not in use.

6. A corn holder comprising a trough, handles for holding an ear of corn supported in the trough, and a scraper secured to the trough to remove surplus butter.

In testimony whereof, I have hereunto set my hand and seal this 7th day of November, 1907, in the presence of two subscribing witnesses.

JACQUES BUSTANOBY.

Witnesses:
JOHN LOTKA,
JOHN A. KEHLENBECK.